United States Patent Office 3,717,646
Patented Feb. 20, 1973

3,717,646
4,4'-(BIS N,N'-CARBAMYL METHYL) DIHYDROBIPYRIDYLS
John Edward Colchester and John Hubert Entwisle, Runcorn, England, assignors to Imperial Chemical Industries Limited, London, England
No Drawing. Filed Aug. 27, 1970, Ser. No. 67,555
The portion of the term of the patent subsequent to Dec. 16, 1986, has been disclaimed
Int. Cl. C07d 31/42
U.S. Cl. 260—295 AM      2 Claims

ABSTRACT OF THE DISCLOSURE 1,1'-disubstituted dihydro-4,4'-bipyridyls and a process for their manufacture by reducing an N-substituted pyridinium salt. The dihydrobipyridyls may be converted by dehydrogenation or oxidation into 1,1'-disubstituted-4,4'-bipyridylium salts which are useful herbicides.

CROSS-REFERENCE TO RELATED APPLICATION

This application relates to the invention disclosed and claimed in U.S. application Ser. No. 541,506, filed Apr. 11, 1966, and now U.S. Pat. 3,484,447, dated Dec. 16, 1969.

This invention relates to novel 1,1'-disubstituted dihydro-4,4'-bipyridyls and a process for their manufacture.

It is known that N-substituted pyridinium salts, for example N-ethyl and N-benzyl pyridinium salts can be reduced either electrolytically or by means of sodium amalgam to form the corresponding N,N'-disubstituted tetrahydro-4,4'-bipyridyls.

We have now found that surprisingly this process can be adapted to provide dihydro-4,4'-bipyridyl derivatives having carbamidoalkyl substituents on the nitrogen atoms, at least one of the carbamidoalkyl substituents, and preferably both, being N,N-dimethyl carbamidomethyl. According to the present invention we provide these dihydrobipyridyls as new compounds, useful as intermediates in making the corresponding 1,1'-disubstituted-4,4'-bipyridylium salts which have hitherto been available only by the interaction of 4,4'-bipyridyl with a chloroacetamide or an analogue thereof.

The 1,1'-disubstituted dihydro-4,4'-bipyridyls have as N-substituent on each nitrogen atom an N,N-dialkyl carbamidomethyl group of the formula

—R₁—CO—NR₂R₃

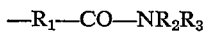

wherein R₁ is a methylene group (—CH₂—) and R₂ and R₃ are both methyl or one is methyl and the other is ethyl or propyl. They can be prepared by reduction of an N-substituted pyridinium salt having the corresponding N-substituent.

The reduction may be carried out electrolytically at the cathode of a cell having an aqueous alkaline electrolyte, and using a cathode made of mercury, lead, or another metal of high hydrogen overpotential.

Alternatively the reduction may be carried out using an alkali metal amalgam, particularly sodium amalgam. We prefer to carry out the reduction at a temperature in the range 0 to 100° C.

The invention may be applied to produce compounds having any of the specified N-substituents, but there may be mentioned in particular dihydrobipyridyl derivatives in which R₂ and R₃ in the above formula are both methyl.

These dihydrobipyridyl derivatives may be isolated either directly as solids by cooling the reaction mixture in which they are formed, or by extraction with an organic solvent. The products are useful for conversion to the corresponding bipyridylium salts by dehydrogenation or oxidation, particularly by the procedures described in U.S. patent specification No. 3,405,135.

The invention is illustrated but in no way limited by the following examples in which the parts and percentages are by weight unless otherwise stated.

Example 1

A solution of N-dimethyl acetamidopyridinium chloride (5 g.) in water (20 mls.) was added to sodium amalgam (50 mls. containing 0.76 g. sodium) under an atmosphere of nitrogen gas. The mixture was stirred for 20 minutes at which time a brown-yellow solid had formed. This solid was removed by filtration and dried under an atmosphere of nitrogen gas. The solid was analysed by nuclear magnetic resonance (N.M.R.) spectroscopy and was identified as 1,1'-di(N-dimethylacetamido)-4,4'-dihydro-4,4'-bipyridyl, of formula

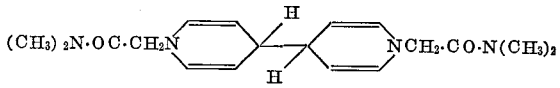

The yield was 35% of theory based on the pyridinium salt fed.

Example 2

Example 1 may be repeated using N-methyl, N-ethyl-acetamidopyridinium chloride as the starting material to give the corresponding 1,1'-di(N-methyl, N-ethyl-acetamido)-4,4'-dihydro-4,4'-bipyridyl.

Example 3

Example 1 may be repeated using N-methyl-N-propyl acetamidopyridinium chloride as the starting material to give the corresponding 1,1'-di(N-methyl, N-ethylacetamido)-4,4'-dihydro-4,4'-bipyridyl.

What we claim is:
1. A compound of the formula

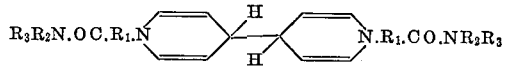

wherein R₁ is methylene, and R₂ and R₃ are both methyl or one is methyl and the other is ethyl or propyl.

2. A compound according to claim 1 wherein R₂ and R₃ are both methyl.

References Cited

UNITED STATES PATENTS 3,484,447   12/1969   Colchester et al. _____ 260—295

ALAN L. ROTMAN, Primary Examiner

U.S. Cl. X.R.

71—94; 260—296 D